United States Patent
Park et al.

(10) Patent No.: US 8,696,185 B2
(45) Date of Patent: Apr. 15, 2014

(54) LIGHT EMITTING MODULE AND LIGHT PROVIDING ASSEMBLY HAVING THE SAME

(75) Inventors: Jin-Hee Park, Cheonan-si (KR); Yong-Woo Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 388 days.

(21) Appl. No.: 13/163,610

(22) Filed: Jun. 17, 2011

(65) Prior Publication Data
US 2012/0075886 A1  Mar. 29, 2012

(30) Foreign Application Priority Data
Sep. 24, 2010  (KR) .................. 10-2010-0092796

(51) Int. Cl.
*F21V 7/04*  (2006.01)
(52) U.S. Cl.
USPC .......................... 362/611; 362/612
(58) Field of Classification Search
USPC ............................ 362/611–612, 630
See application file for complete search history.

(56) References Cited

U.S. PATENT DOCUMENTS

| | | | | |
|---|---|---|---|---|
| 6,114,759 A | * | 9/2000 | Okuaki | 257/692 |
| 2009/0167142 A1 | * | 7/2009 | Kokubu et al. | 313/318.11 |
| 2009/0196070 A1 | * | 8/2009 | Kim | 362/613 |

FOREIGN PATENT DOCUMENTS

| | | |
|---|---|---|
| JP | 06-204569 A | 7/1994 |
| JP | 2007-311639 A | 11/2007 |
| KR | 1020080006052 A | 1/2008 |
| KR | 1020090024367 A | 3/2009 |

* cited by examiner

*Primary Examiner* — Joseph L Williams
(74) *Attorney, Agent, or Firm* — Innovation Counsel LLP

(57) ABSTRACT

A light emitting module includes a light emitting chip generating light, a case and a lead frame. The case includes a bottom plate and sidewalls connected to the bottom plate. The bottom plate and the sidewalls define a receiving space in which the light emitting chip is received. The light is emitted in a first direction through an opening portion opposite to the bottom plate. The lead frame includes an electrode portion disposed in the case, and electrically connected to the light emitting chip, a connecting portion extending from the electrode portion and disposed outside of the case, a mounted portion disposed adjacent to the connecting portion, and a buffering portion disposed between the connecting portion and the mounted portion. The buffering portion has a generally nonlinear shape protruding in a direction substantially perpendicular to the first direction.

18 Claims, 10 Drawing Sheets

LIGHT EMITTING MODULE AND LIGHT PROVIDING ASSEMBLY HAVING THE SAME

PRIORITY STATEMENT

This application claims priority under 35 U.S.C. §119 to Korean Patent Application No. 2010-92796, filed on Sep. 24, 2010 in the Korean Intellectual Property Office (KIPO), the entire content of which is herein incorporated by reference.

BACKGROUND OF THE INVENTION

1. Field of the Invention

Embodiments of the invention relate generally to flat panel displays. More specifically, embodiments of the invention relate to a light emitting module of a flat panel display backlight.

2. Description of the Related Art

Generally, a liquid crystal display apparatus includes a display panel displaying an image using light, and a light providing assembly providing the light to the display panel. The display panel includes a first substrate including a switching element driving a pixel, and a second substrate opposite to the first substrate. A liquid crystal layer is disposed between the first and second substrates. The second substrate usually includes a color filter which is used for the display apparatus to display the color image.

The light providing assembly includes a light emitting module, and a plurality of optical elements to effectively provide emitted light to the display panel. In the past, light emitting modules typically used a cold cathode fluorescent lamp (CCFL) or an external electrode fluorescent lamp (EEFL). However, recently, such modules have instead made increasing use of light emitting diodes (LEDs) having relatively high luminance. The LEDs are electrically and physically connected to a printed circuit board to receive a light source driving signal from a light source driver, so that the LEDs emit light.

It is known that the relative positions of the light emitting module and optical element have an effect on the luminance of the light providing assembly. For example, as a distance between a light guide plate (optical element) and the light emitting module is increased, more light may be lost, as less light is transmitted to the light guide plate. This may result in decreased luminance.

In contrast, when the light emitting module is disposed close to the optical element to minimize the loss of light provided from the light emitting module, the light guide plate may be expanded and deformed due to heat from the light emitting module. The expansion and deformation of the light guide plate can result in detrimental effects such as separation of the light emitting module from the printed circuit board, which can lead to disconnection of the light emitting module from its power source.

SUMMARY OF THE INVENTION

Example embodiments of the present invention provide a light emitting module capable of reducing movement caused by an external force.

Example embodiments of the present invention also provide a light providing assembly having the light emitting module.

In an example light emitting module according to the present invention, the light emitting module includes a light emitting chip, a case and a lead frame. The light emitting chip is capable of generating light. The case includes a bottom plate and a plurality of side walls connected to the bottom plate. The bottom plate and the side walls define a receiving space in which the light emitting chip is received. The generated light is emitted in a first direction through an opening portion opposite to the bottom plate. The lead frame includes an electrode portion, a connecting portion, a mounted portion, and a buffering portion. The electrode portion is disposed in the case, and electrically connected to the light emitting chip. The connecting portion extends from the electrode portion and is disposed at least partially outside of the case. The mounted portion is disposed adjacent to the connecting portion and affixed to a surface of a printed circuit board. The buffering portion is disposed between the connecting portion and the mounted portion, and has a generally nonlinear shape protruding in a direction substantially perpendicular to the first direction.

The buffering portion may extend from the connecting portion in the direction substantially perpendicular to the first direction, may further extend toward the mounted portion, and may be connected to the mounted portion so that the buffering portion protrudes from the connecting portion and the mounted portion. The buffering portion may have a ∩-shape or a ^-shape protruding from both the connecting portion and the mounted portion in the direction substantially perpendicular to the first direction.

In the example embodiment, the connecting portion and the mounted portion may be disposed at least partially parallel to a first side wall of the side walls. The buffering portion extends toward a second side wall that is opposite the first side wall. The connecting portion, the buffering portion and the mounted portion may be disposed adjacent to a third side wall positioned between the first side wall and the second side wall. The mounted portion may include an extended portion extending from an area proximate to the third side wall to an area proximate to the bottom plate, and positioned substantially parallel to the first side wall.

Alternatively, the connecting portion may extend through the bottom plate. The buffering portion and the mounted portion may be disposed proximate to the bottom plate.

In the example embodiment, the buffering portion may extend generally away from a third side wall that connects a first side wall with a second side wall that is opposite to the first side wall, and that is substantially perpendicular to the bottom plate. The connecting portion and the buffering portion may be disposed proximate to the third side wall. An end portion of the buffering portion may be bent toward the first side wall so that the mounted portion may face the first side wall.

Alternatively, the buffering portion and the mounted portion may generally face the first side wall.

In an example light providing assembly according to the present invention, the light providing assembly includes a light guide plate, a light emitting module and a printed circuit board. The light guide plate includes a light incident surface and a light exiting surface. Light enters through the light incident surface. The light provided through the incident surface exits through the light exiting surface. The light emitting module includes a light emitting chip, a case, and a lead frame. The light emitting chip faces the incident surface and is configured to provide light to the light incident surface of the light guide plate. The case includes a bottom plate and a plurality of side walls connected to the bottom plate. The bottom plate and the side walls define a receiving space in which the light emitting chip is received. The light is emitted in a first direction through an opening portion opposite to the bottom plate. The lead frame includes an electrode portion, a connecting portion, a mounted portion, and a buffering portion. The electrode portion is disposed in the case, and electrically connected to the light emitting chip. The connecting portion extends from the electrode portion and is disposed at least partially outside of the case. The mounted portion is disposed adjacent to the connecting portion. The buffering portion is disposed between the connecting portion and the mounted portion, and has a generally nonlinear shape protruding in a direction substantially perpendicular to the first direction. The printed circuit board has a surface facing at least one of the bottom plate and any one of the side walls, electrically connected to the mounted portion so as to affix the light emitting module to the surface, and is configured to transmit a light source signal to the light emitting module.

In the example embodiment, the buffering portion may extend from the connecting portion in the direction substantially perpendicular to the first direction, may further extend toward the mounted portion, and may be connected to the mounted portion so that the buffering portion may protrude from the connecting portion and the mounted portion. The connecting portion and the mounted portion may be disposed at least partially parallel to a first side wall of the side walls. The buffering portion may extend toward a second side wall that is opposite the first side wall. The connecting portion, the buffering portion and the mounted portion may be disposed adjacent to a third side wall positioned between the first side wall and the second side wall. The mounted portion may include an extended portion extending from an area proximate to the third side wall to an area proximate to the bottom plate, so as to face the bottom plate.

Alternatively, the connecting portion may extend through the bottom plate. The buffering portion and the mounted portion may be disposed proximate to the bottom plate. The connecting portion, the buffering portion and the mounted portion may be disposed on the surface of the printed circuit board.

In the example embodiment, the buffering portion may extend generally away from a third side wall that connects a first side wall with a second side wall that is opposite the first side wall and that is substantially perpendicular to the bottom plate, where the first side wall is substantially parallel to the printed circuit board. The connecting portion and the buffering portion may be disposed proximate to the third side wall. An end portion of the buffering portion may be bent toward the first side wall so that the mounted portion may be disposed between the first side wall and the surface of the printed circuit board.

Alternatively, the buffering portion and the mounted portion may be disposed between the first side wall and the printed circuit board. A portion of the first side wall may be recessed from the surface of the printed circuit board so as to form a space between the printed circuit board and the case. The buffering portion and the mounted portion may be disposed in the space.

According to the light emitting module and the light providing assembly of the present invention, the lead frame of the light emitting module includes a buffering portion, so that the light emitting module is more effectively kept from being separated from the printed circuit board by an external force applied to the light emitting module.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

Hereinafter, the present invention will be explained in detail with reference to the accompanying drawings.

Figure 1:
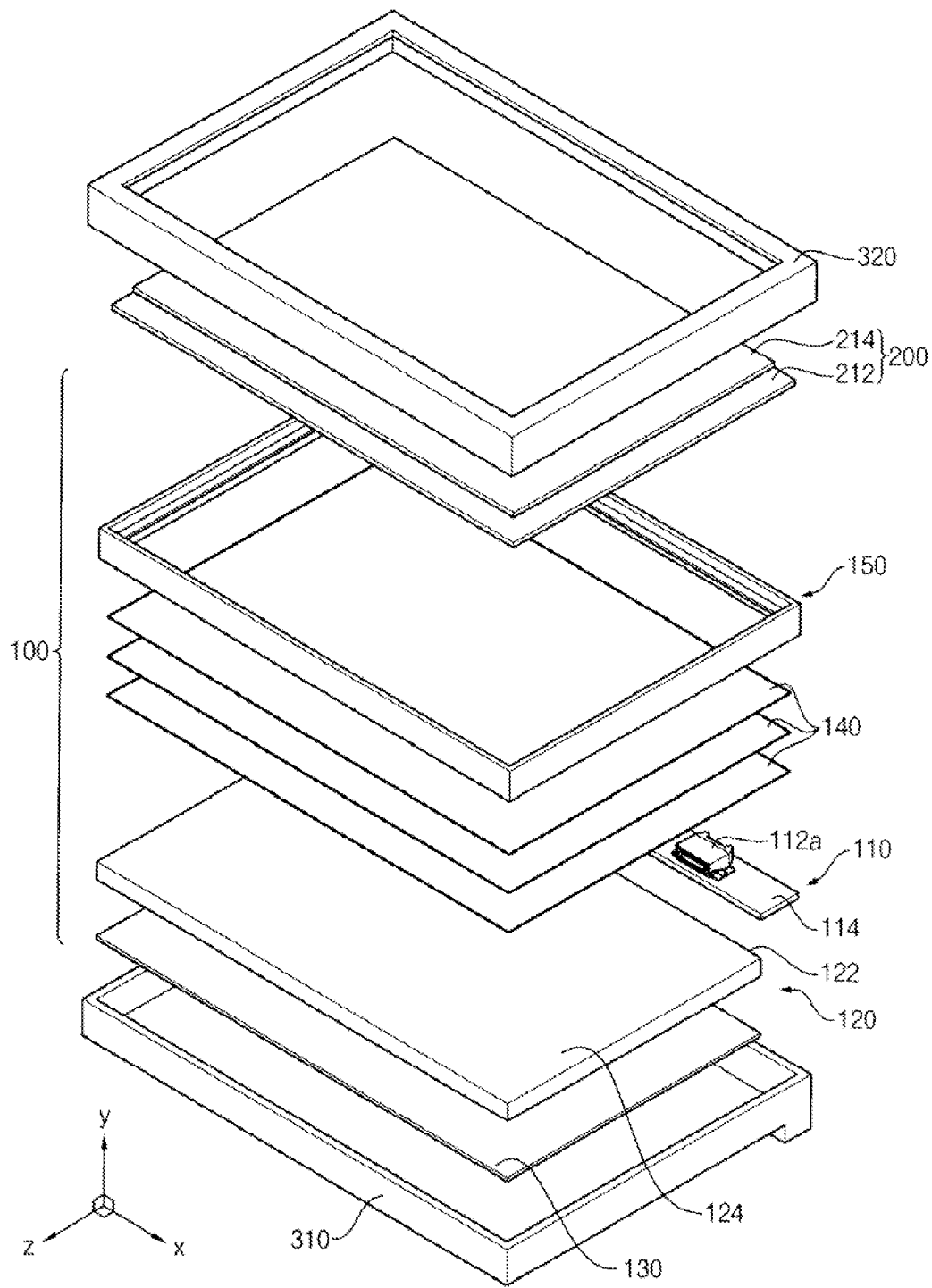
FIG. 1 is a perspective view illustrating a display apparatus according to an example embodiment of the present invention.

FIG. 1 is a perspective view illustrating a display apparatus according to an example embodiment of the present invention.

Referring to FIG. 1, the display apparatus 500 according to the present invention includes a light providing assembly 100, a display panel 200 including two substrates 212 and 214 facing each other with a liquid crystal layer (not shown) disposed between the two substrates 212 and 214, a bottom chassis 310 and a top chassis 320. The light providing assembly 100 and the display panel 200 are disposed between the bottom chassis 310 and the top chassis 320.

The light providing assembly 100 provides light to the display panel 200, where the display panel 200 displays an image using this light. The light providing assembly 100 includes a light source part 110, a light guide plate 120, a reflective plate 130 and optical sheets. The light providing assembly 100 may further include a mold frame 150. The mold frame 150 is disposed between the display panel 200 and the optical sheets 140 so that the mold frame 150 may support the display panel 200 with the bottom chassis 310 and may fix the optical sheets 140, the light guide plate 120 and the reflective plate 130 to the bottom chassis 310.

The light source part 110 includes a plurality of light emitting modules 112a that each generate light. In this embodiment, a plurality of the light emitting modules 112a is mounted on a printed circuit board 114. The printed circuit board 114 receives a light source signal for driving the light emitting module 112a, and transmits the light source signal to the light emitting modules 112a. In the present example embodiment, the light emitting module 112a includes a light emitting diode (LED) package including an LED chip. The light emitting module 112a faces an incident surface 122 of the light guide plate 120, so that light provided from the light emitting module 112a enters the light guide plate 120 through the incident surface 122 and exits the light guide plate 120 through an exit surface 124 of the light guide plate. The light emitting module 112a generally provides the light in a direction substantially perpendicular to the incident surface 122. For example, when a space is defined as an X axis, a Y axis and a Z axis, the incident surface 122 may be disposed on a plane substantially parallel with an X-Y plane defined by the X axis and the Y axis. The light emitting module 112*a* may provide the light toward the light incident surface 122 in a direction substantially parallel to the Z axis.

Hereinafter, the light emitting module 112*a* may be explained in detail referring to FIGS. 1-4.

Figure 2:
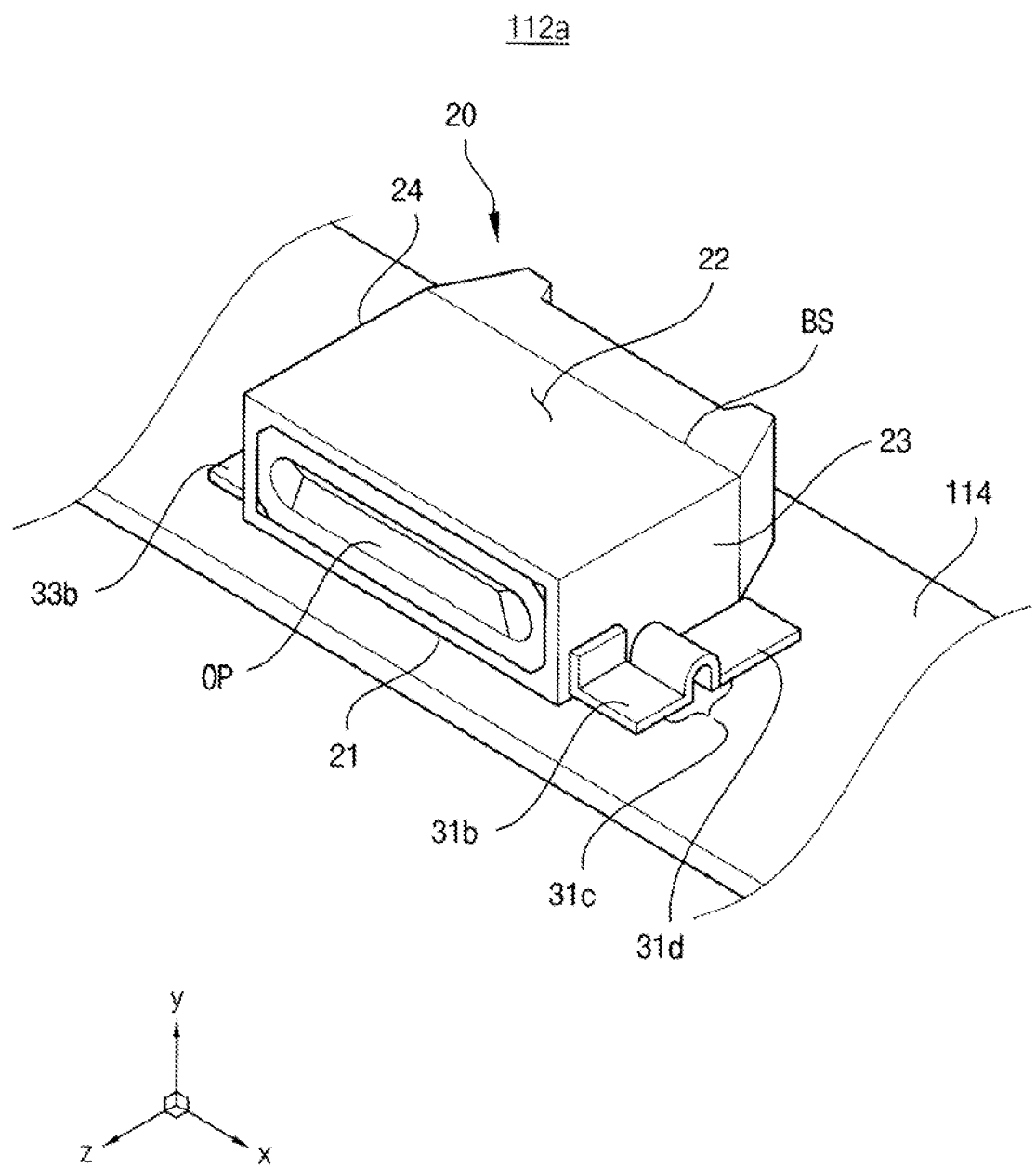
FIG. 2 is a partially enlarged perspective view illustrating a light emitting module of FIG. 1.
Figure 3:
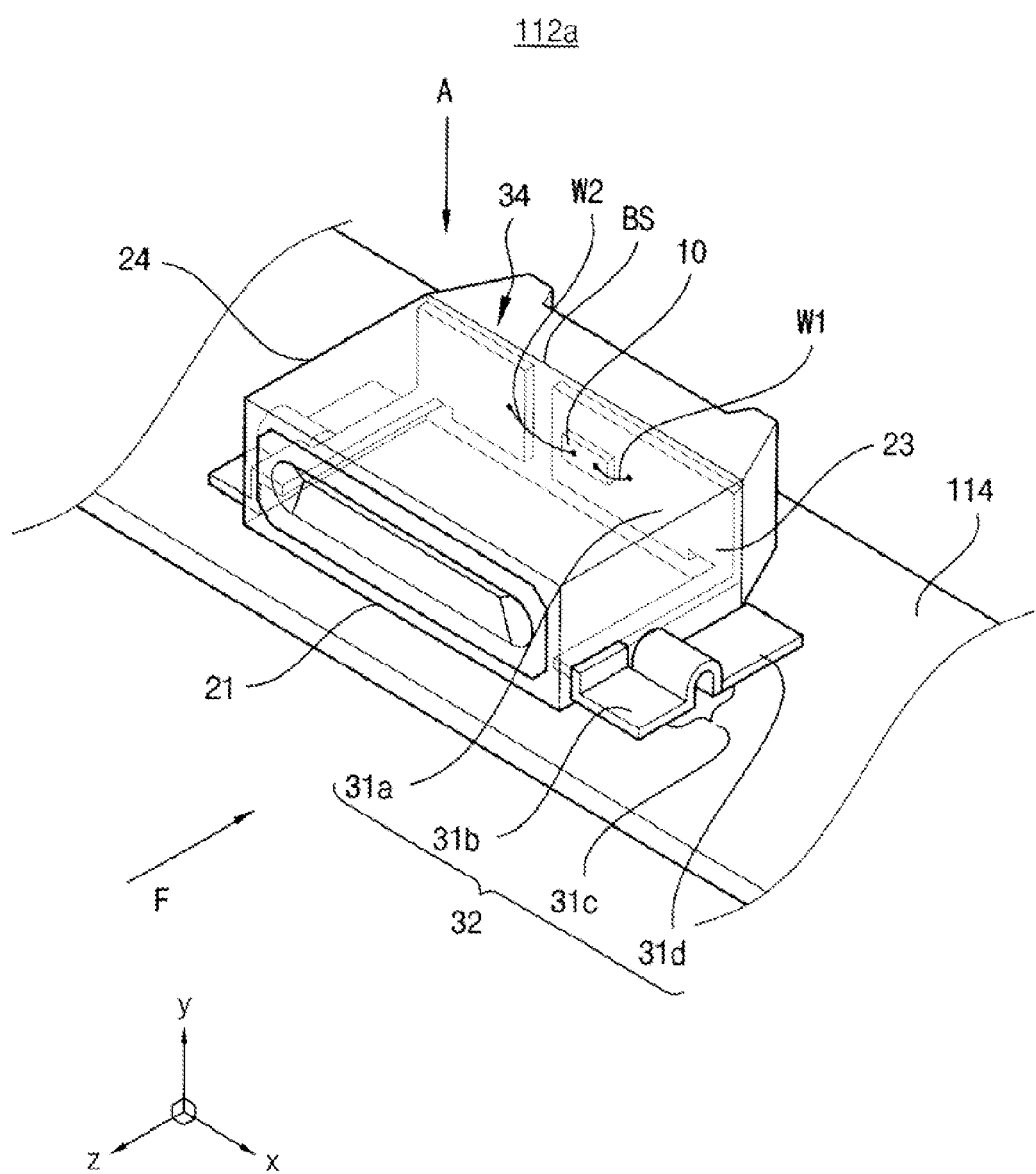
FIG. 3 is a projected perspective view to explain a structure of a lead frame of the light emitting module of FIG. 1.
Figure 4:
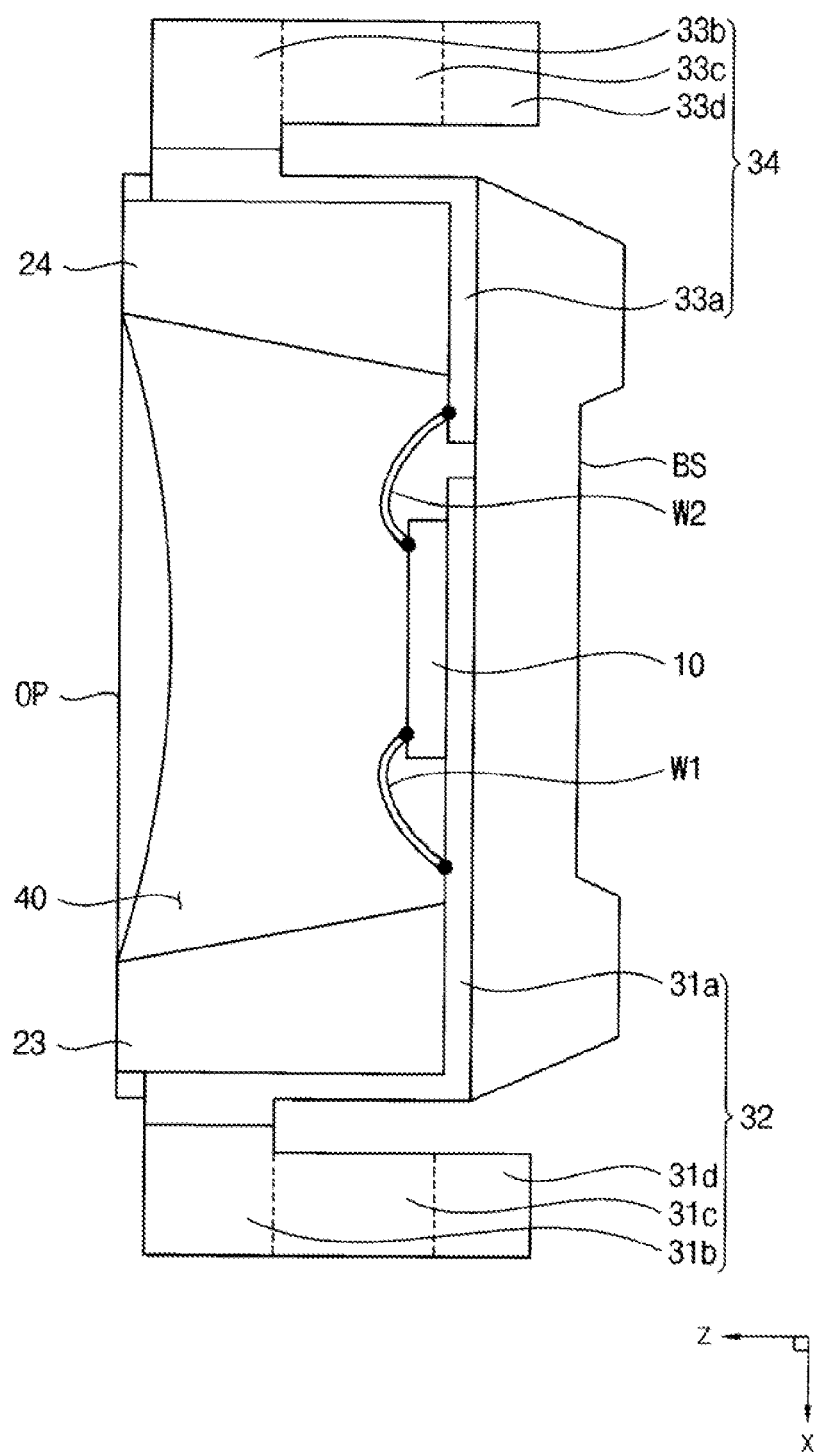
FIG. 4 is a plan view illustrating the light emitting module of FIG. 3 viewed in a direction A.

FIG. 2 is a partially enlarged perspective view illustrating a light emitting module of FIG. 1. FIG. 3 is a projected perspective view to explain a structure of a lead frame of the light emitting module of FIG. 1. FIG. 4 is a plan view illustrating the light emitting module of FIG. 3 viewed in a direction A.

Referring to FIGS. 1 to 4, the light emitting module 112*a* according to the present invention includes a light emitting chip 10, a case 20, and first and second lead frames 32 and 34. The light emitting module 112*a* further includes first and second wires W1 and W2 and a light transforming layer 40.

The light emitting chip 10 includes an LED chip that generates light using an electroluminescent effect. The light emitting chip 10 may be a diode having a structure of gallium nitride/aluminum oxide ($GaN/Al_2O_3$). The light emitting chip 10 is covered by a light transforming layer 40 so that the light generated from the light emitting chip 10 may be transformed into different light. For example, the light emitting chip 10 may generate blue light, and the blue light may be transformed into white light when the blue light passes through the light transforming layer 40.

The case 20 receives the light emitting chip 10, surrounding and protecting it. A portion of the first and second lead frames 32 and 34 may be disposed within the case 20, and the other portions of the first and second lead frames 32 and 34 may be disposed outside the case 20. The case 20 may include an insulating material protecting and insulating the light emitting chip 10. For example, the case 20 may include a polymer or a ceramic.

The case 20 includes a bottom plate BS, and first, second, third and fourth side walls 21, 22, 23 and 24 connected to the bottom plate BS and extending substantially perpendicular thereto. The bottom plate BS and the first to fourth side walls 21, 22, 23 and 24 collectively define an inside of the case 20. A portion of the case 20 opposite to the bottom plate BS is opened, and can be defined as an opening portion OP of the case 20. The opening portion OP faces the light incident surface 122 of the light guide plate 120, and the light incident surface 122 is approximately parallel to the bottom plate BS. End portions of the first to fourth side walls 21, 22, 23 and 24 may directly contact the light incident surface 122 of the light guide plate 120 (although this need not necessarily be the case, and the invention contemplates embodiments in which the surface 122 is spaced apart from the plate 120). Accordingly, a distance between the light emitting module 112*a* and the light guide plate 120 may be substantially about 0 mm. The light emitting chip 10 is disposed on the bottom plate BS, and emits light in a first direction (+Z axis direction) toward the opening portion OP. The bottom plate BS may be disposed on a plane substantially parallel with the X-Y plane, substantially same as the incident surface 122. That is, the plate BS may be substantially parallel to incident surface 122. The first side wall 21 is substantially parallel to the surface of the printed circuit board 114 that it faces. The second side wall 22 is positioned opposite to the first side wall 21, and the first side wall 21 is disposed between the printed circuit board 114 and the second side wall 22. Each of the first and second side walls 21 and 22 is oriented substantially parallel to the X-Z plane, i.e. substantially perpendicular to the X-Y plane. The third side wall 23 connects the first side wall 21 with the second side wall 22. The fourth side wall 24 connects the first side wall 21 with the second side wall 22, and faces the third side wall 23. Each of the third and fourth side walls 23 and 24 is oriented substantially parallel to the Y-Z plane, substantially perpendicular to the X-Z plane and the X-Y plane. The first to fourth side walls 21, 22, 23 and 24 may each have varying thickness, with their thicknesses increasing from the opening portion OP to the bottom plate BS. That is, the first to fourth side walls 21, 22, 23 and 24 may collectively define a funnel shape within the case 20.

Each of the first and second lead frames 32 and 34 is electrically connected to the light emitting chip 10 via signal lines on the printed circuit board 114. In this manner, the light source signal applied to the signal line is transmitted to the light emitting chip 10 through the first and second lead frames 32 and 34.

The first lead frame 32 includes a first electrode portion 31*a*, a first connecting portion 31*b*, a first buffering portion 31*c* and a first mounted portion 31*d*. The first electrode portion 31*a* is disposed inside of the case 20, and the first connecting portion 31*b*, the first buffering portion 31*c* and the first mounted portion 31*d* are disposed outside of the case 20. The first connecting portion 31*b* extends from the first electrode portion 31*a*, and passes through the case 20 so that the first connecting portion 31*b*, the first buffering portion 31*c* and the first mounted portion 31*d* may be disposed outside of the case 20.

The first electrode portion 31*a* is disposed on the bottom plate BS, and the light emitting chip is disposed on the first electrode portion 31*a*. The first electrode portion 31*a* may be electrically connected to the light emitting chip 10 through a first wire W1. The first electrode portion 31*a* may be oriented substantially parallel to the X-Y plane. The first electrode portion 31*a* extend from the bottom plate BS to the opening portion OP along an inner surface of the third side wall 23.

The first connecting portion 31*b* extends from the first electrode portion 31*a*, and passes through the case 20 so that the first connecting portion 31*b* is disposed partially inside and partially outside of the case 20. For example, the first connecting portion 31*b* may be extended from an end portion of the first electrode portion 31*a* (that is disposed at the third side wall 23 adjacent to the opening portion OP), and the first connecting portion 31*b* may be bent so as to pass through the third side wall 23. Alternatively, the first connecting portion 31*b* may extend from an end portion of the first electrode portion 31*a*, and may be bent so as to pass through the first side wall 21. The first connecting portion 31*b* may have at least a portion that is oriented substantially parallel to the printed circuit board 114. The first connecting portion 31*b* may be disposed in an area adjacent to the third side wall 23, and may have a lower surface directly contacting the surface of the printed circuit board 114 (or contacting the surface via a solder plane or some other intermediate connection). The area adjacent to the third side wall 23 may be defined as any area near the outer surface of the third side wall 23.

The first buffering portion 31*c* is connected to the first connecting portion 31*b* and disposed adjacent to the first connecting portion 31*b* in a direction (−Z axis direction) opposite to the first direction. The first mounted portion 31*d* is disposed adjacent to the first buffering portion 31*c* in the direction opposite to the first direction (−Z axis direction). The first connecting portion 31*b* is disposed at a first side of the first buffering portion 31*c*, and the first mounted portion 31*d* is disposed at a second side of the first buffering portion 31*c* opposite to the first side of the first buffering portion 31*c*. The first direction (+Z axis direction) extends, for example, from the first buffering portion 31c to the first connecting portion 31b, a direction substantially the same as a direction along which light travels from the light emitting module 112a to the light guide plate 120. The first buffering portion 31c may be disposed in an area adjacent to the third side wall 23. The first buffering portion 31c initially extends upward from the second electrode portion 31b in a second direction substantially perpendicular to the first direction (+Y axis direction), and curves downward to the first mounted portion 31d. The generally bent shape of the first buffering portion 31c helps to absorb and buffer impacts. As one example, the first buffering portion 31c may have an upwardly protruding shape such as a ∩-shape (i.e. generally an upside-down "U" shape), a ˆ-shape (i.e. generally an upside-down "V" shape), and so on, which are protruded in the +Y axis direction. In the present example embodiment, though the first buffering portion 31c is shown as having a ∩-shape, the first buffering portion 31c may have any nonlinear shape, such as a sine waveform having a plurality of convex and concave patterns, or a spring or springlike shape.

The first mounted portion 31d is connected to the first buffering portion 31c, and has a lower surface directly contacting the surface of the printed circuit board 114. The first mounted portion 31d may be disposed at the area adjacent or proximate to the third side wall 23. The first mounted portion 31d is positioned substantially coplanar with the first connecting portion 31b. Accordingly, the first buffering portion 31c protrudes outward from the first mounted portion 31d and the first connecting portion 31b. The first mounted portion 31d is electrically and physically connected to a pad (not shown) which is an end portion of the signal line, typically by soldering. The first lead frame 32 is electrically and physically connected to the printed circuit board 114 through the first mounted portion 31d. Accordingly, the case 20 is affixed to the printed circuit board 114.

As explained above, the first mounted portion 31d is fixed on the surface of the printed circuit board 114, so that the first lead frame 32 is fixed on the printed circuit board 114 and is not moved even though an external force F is applied to the light emitting module 112a having a component in either the first direction (+Z axis direction) or a direction (−Z axis direction) opposite to the first direction. However, when a shear force concentrated at the first mounted portion 31d due to the external force F exceeds the strength of the bond between the first mounted portion 31d and the surface of the printed circuit board 114, the first mounted portion 31d can be separated from the printed circuit board 114. Therefore, the first buffering portion 31c is formed between the first connecting portion 31b and the first mounted portion 31d to absorb the shear forces, preventing a disbonding of the lead frame 32 from the circuit board 114. More specifically, the compliance or flexibility of the first buffering portion 31c reduces the amount of shear force that an externally applied impact imparts on the first mounted portion 31d. It can also be observed that the first buffering portion 31c also acts to absorb forces applied from other directions, such as the Y- and Z-axis directions. That is, while the shape of the first buffering portion 31c allows it to better absorb impact that applies forces in the +/−Z-direction, it will also absorb impact from other directions, although to a somewhat lesser degree.

The amount of impact energy absorbed by the first buffering portion 31c may be varied according to the thickness, curvature and length of the bent portion of the first buffering portion 31c, as well as its overall shape. The buffering portion 31c may be designed such that many external forces cause the light emitting module 112a to move within a maximum range of about 0.7 mm in the direction (−Z axis direction) opposite to the first direction, and to prevent the first mounted portion 31d from being separated from the printed circuit board 114.

The second lead frame 34 includes a second electrode portion 33a, a second connecting portion 33b, a second buffering portion 33c and a second mounted portion 33d. The second electrode portion 33a, the second connecting portion 33b, the second buffering portion 33c and the second mounted portion 33d are substantially the same as the first electrode portion 31a, the first connecting portion 31b, the first buffering portion 31c and the first mounted portion 31d respectively, except that the second lead frame 34 is disposed adjacent/proximate to the fourth side wall 24, and the second electrode portion 33a is electrically connected to the light emitting chip 10 through the second wire W2. Thus, any repetitive explanation will be omitted.

In addition, the second lead frame 34 buffers external forces in substantially the same manner as that of the first lead frame 32. Thus, any repetitive explanation will be omitted. The first and second lead frames 32 and 34 buffer both sides of the case 20 from the external force F, so that movement of the light emitting module 112a in the direction opposite to the first direction may be reduced.

The light emitting module 112a may further include a current regulative diode (not shown). The light emitting module 112a may be disposed on the second electrode portion 33a, and electrically connected to the first electrode portion 31a of the first lead frame 32 through a third wire (not shown).

According to the present example embodiment, the buffering portions 31c, 33c reduce movement of the light emitting module 112a in the −Z axis direction due to externally-applied forces. For example, thermal expansion of the light guide plate 120 may result in force applied to the light emitting module 112a in the direction opposite to the first direction. The first and second buffering portions 31c and 33c may absorb this external force, deforming so as to prevent the light emitting module from being separated from the printed circuit board 114.

Figure 5:
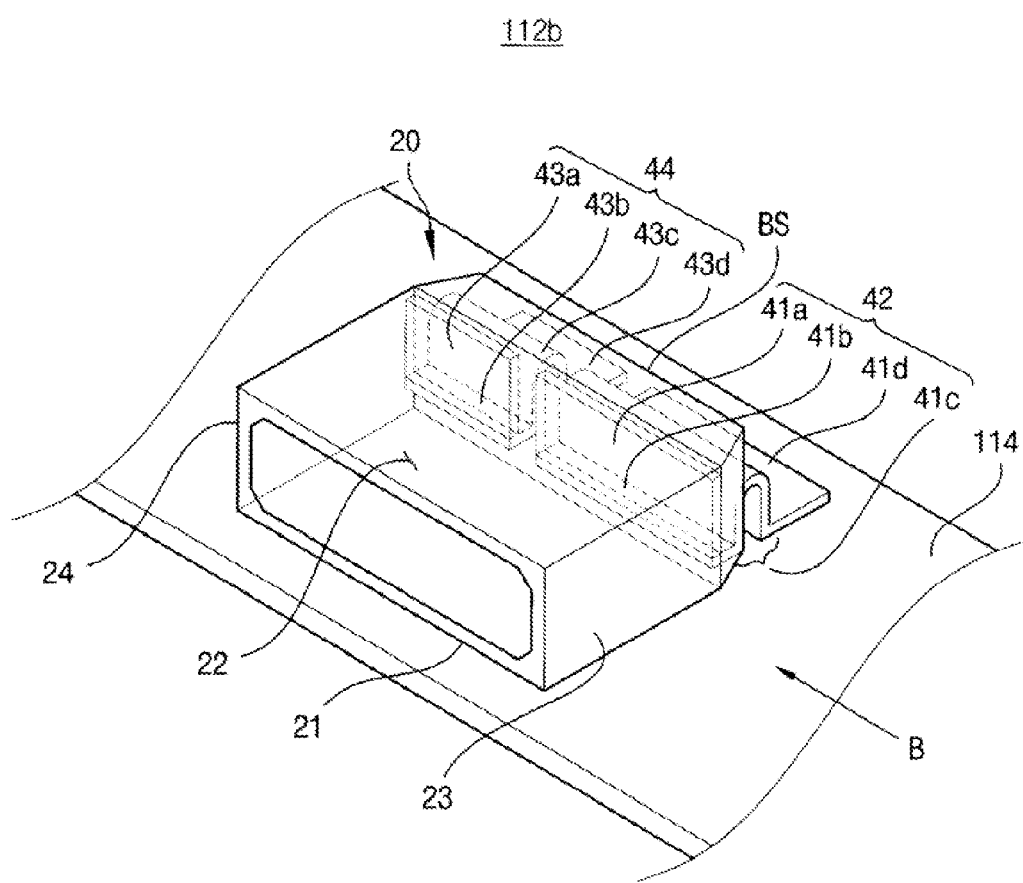
FIG. 5 is a perspective view illustrating a light emitting module according to another example embodiment of the present invention.
Figure 6:
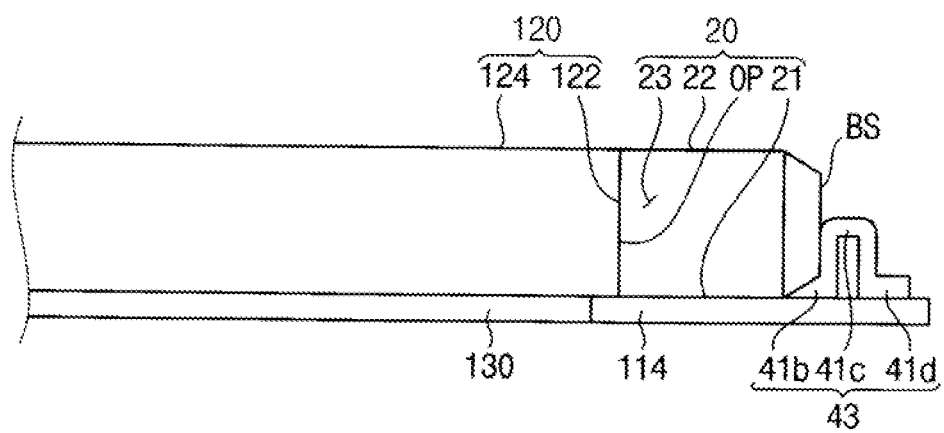
FIG. 6 is a side view illustrating the light emitting module of FIG. 3 viewed in a direction B.

FIG. 5 is a perspective view illustrating a light emitting module according to another example embodiment of the present invention. FIG. 6 is a side view illustrating the light emitting module of FIG. 3 viewed in a direction B.

A display apparatus of the present example embodiment is substantially the same as the display apparatus of the previous example embodiment shown in FIG. 1, except for the light emitting module. The light emitting module of the present example embodiment is substantially the same as the light emitting module of the previous example embodiment shown in FIGS. 1 to 4, except for the lead frame structure. Thus, any repetitive explanation will be omitted.

Referring to FIGS. 5 and 6, the light emitting module 112b according to the present example embodiment includes a light emitting chip 10, a case 20, and first and second lead frames 42 and 44. The light emitting chip 10 is electrically connected to the first lead frame 42 through a first wire W1, and electrically connected to the second lead frame 44 through a second wire W2.

The first lead frame 42 includes a first electrode portion 41a, a first connecting portion 41b, a first buffering portion 41c and a first mounted portion 41d. The first electrode portion 41a is disposed inside of the case 20, and the first connecting portion 41b, the first buffering portion 41c and the first mounted portion 41d are disposed outside of the case 20. The first connecting portion 41b extends from the first electrode portion 41a, and passes through the case 20 so that the first connecting portion 41b, the first buffering portion 41c and the first mounted portion 41d may be disposed outside of the case 20.

The first electrode portion 41a is disposed on a bottom plate BS of the case 20. The first electrode portion 41a may be positioned substantially perpendicular to a surface of a printed circuit board 114.

The first connecting portion 41b extends from the first electrode portion 41a and passes through the case 20 from the inside, so that the first connecting portion 41b is partially disposed outside of the case 20. As one example, the first connecting portion 41b may extend from a lower end of first electrode portion 41a to connect with first buffering portion 41c, so that the portion 41b lies partially within and partially outside of the case 20. That is, the first connecting portion 41b may extend from the first electrode portion 41a, and may have a lower surface directly contacting the surface of the printed circuit board 114.

The first buffering portion 41c is connected to the first connecting portion 41b and disposed adjacent to the first connecting portion 41b. Similar to buffering portion 31c, the first buffering portion 41c has a nonlinear shape for absorbing energy due to impact forces, or for deforming so as to prevent a disbonding of the mounted portion 41d from the circuit board 114. Here, the first buffering portion 41c is curved so as to protrude upward (in the Y-axis direction). The first mounted portion 41d is disposed adjacent to the first buffering portion 41c and extends in a direction (−Z axis direction) opposite to the first direction. In this manner, the first connecting portion 41b is disposed at a first side of the first buffering portion 41c, and the first mounted portion 41d is disposed at a second side of the first buffering portion 41c opposite to the first side of the first buffering portion 41c.

The first buffering portion 41c and the first mounted portion 41d are, in function, substantially the same as the first buffering portion 31c and the first mounted portion 31d respectively, except that the first buffering portion 41c and the first mounted portion 41d are disposed in an area adjacent or proximate to the bottom plate BS, and extend outward from the bottom plate BS. Thus, any repetitive explanation will be omitted. The area adjacent/proximate to the bottom plate BS may be defined any area near the bottom plate BS.

The second lead frame 44 includes a second electrode portion 43a, a second connecting portion 43b, a second buffering portion 43c and a second mounted portion 43d. The second lead frame 44 is substantially the same as the first lead frame 42 except that the second wire W2 connected to the light emitting chip 10 is electrically connected to the second electrode portion 43a. Thus, any repetitive explanation will be omitted.

According to the present example embodiment, the movement of the light emitting module 112b due to shock may be minimized by the first and second buffering portions 41c and 43c. For example, in the light emitting module 112b, the first buffering portion 41c and the first mounted portion 41d are disposed in the area adjacent/proximate to the bottom plate BS so that external force in the direction (−Z axis direction) opposite to the first direction may be effectively absorbed.

Figure 7:
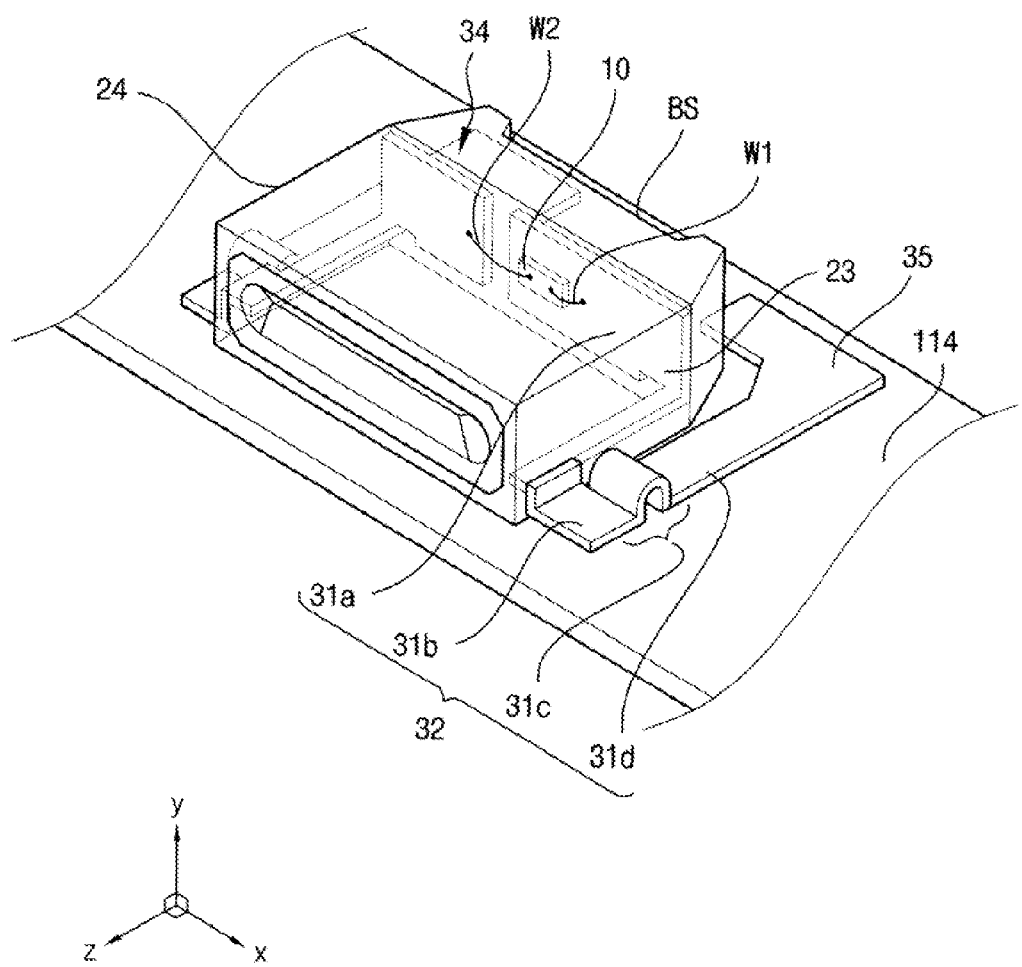
FIG. 7 is a projected perspective view illustrating a light emitting module according to still another example embodiment of the present invention.

FIG. 7 is a projected perspective view illustrating a light emitting module according to still another example embodiment of the present invention.

A display apparatus according to the present example embodiment is substantially the same as the display apparatus according to the embodiment shown in FIG. 1, except for its light emitting module. Thus, any repetitive explanation will be omitted.

Referring to FIG. 7 with reference to FIGS. 1 to 4, the light emitting module 112c according to the present example embodiment includes a light emitting chip 10, a case 20, first and second lead frames 32 and 34. The first lead frame 32 of the present example embodiment is substantially the same as the first lead frame 32 of the previous example embodiment shown in FIGS. 2 to 4, except that the first mounted portion 31d of the first lead frame 32 of the present example embodiment further includes an extended portion 35. Thus, any repetitive explanation will be omitted.

The extended portion 35 is a portion of the first mounted portion 31d. The extended portion 35 is connected to the printed circuit board 114 by being soldered on the surface of the printed circuit board 114, so as to be electrically and physically connected to the printed circuit board 114. The extended portion 35 extends from an area adjacent, or proximate, to the third side wall 23 to an area adjacent/proximate to the bottom plate BS, so that the extended portion 35 wraps around the corner formed by the third side wall 23 and the bottom plate BS. This increases the surface area that is affixed to the circuit board 114, effectively increasing the strength of the bond between the first lead frame 32 and the printed circuit board 114.

The second lead frame 34 according to the present example embodiment is substantially the same as the first lead frame 32, except that the second lead frame 34 is disposed around the corner formed by fourth side wall 24 and bottom plate BS. Thus, any repetitive explanation will be omitted.

According to the present example embodiment, the movement of the light emitting module 112c due to externally applied forces may be minimized by the first and second buffering portions 31c and 33c. For example, in the light emitting module 112c, the first mounted portion 41d is disposed in the area adjacent or proximate to the bottom plate BS as well as the area adjacent to the third side wall 23, so that the external force in the direction (−Z axis direction) opposite to the first direction may be effectively absorbed.

Figure 8:
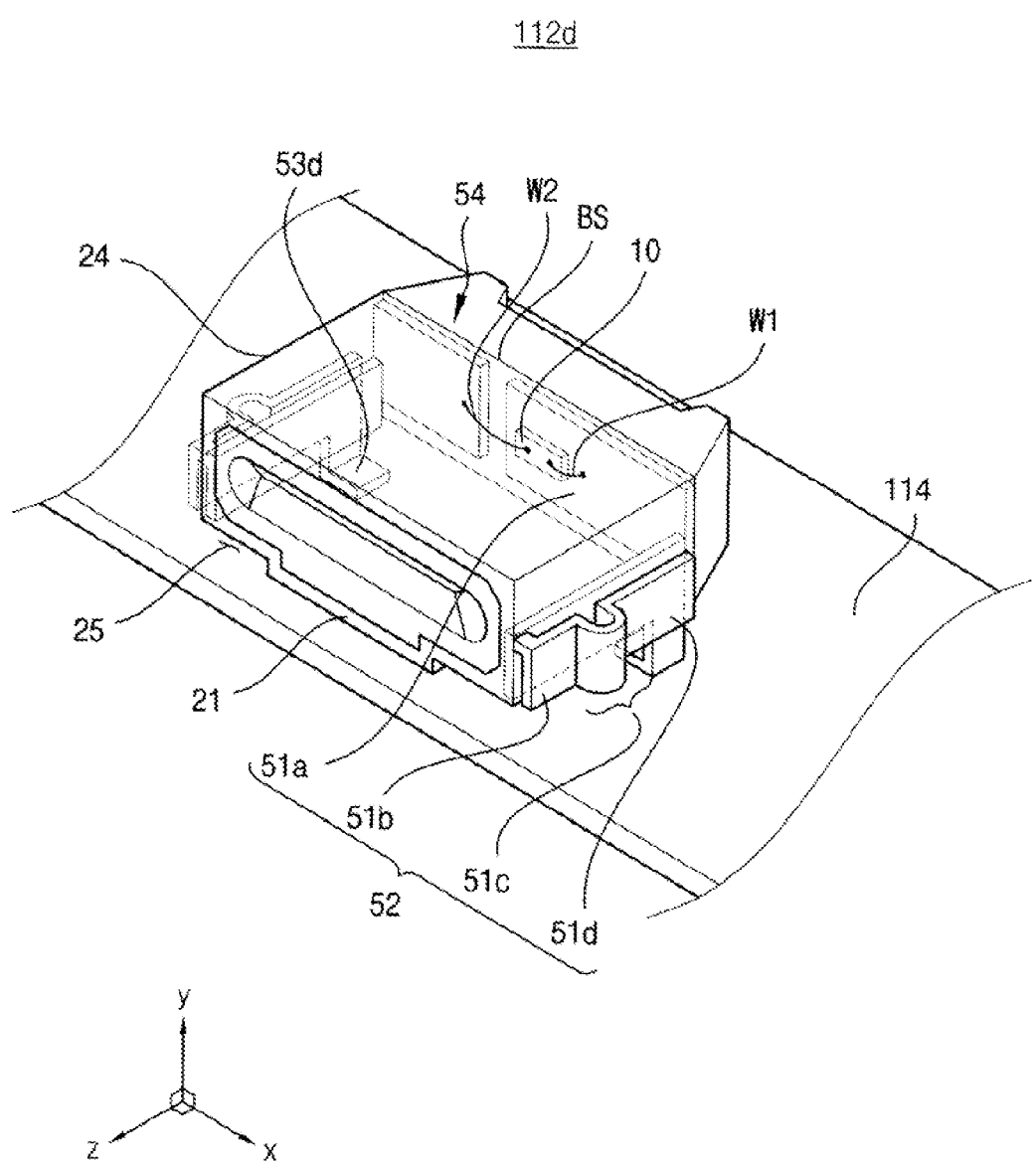
FIG. 8 is a projected perspective view illustrating a light emitting module according to still another example embodiment of the present invention.

FIG. 8 is a projected perspective view illustrating a light emitting module according to still another example embodiment of the present invention.

A display apparatus according to the present example embodiment is substantially the same as the display apparatus according to the example embodiment shown in FIG. 1, except for its light emitting module. Thus, any repetitive explanation will be omitted.

Referring to FIG. 8 with reference to FIGS. 1 to 4, the light emitting module 112d according to the present example embodiment includes a light emitting chip 10, a case 20, and first and second lead frames 52 and 54. The light emitting chip 10 is electrically connected to the first lead frame 52 through a first wire W1, and electrically connected to the second lead frame 54 through a second wire W2.

The case 20 includes a first side wall 21, a second side wall 22, a third side wall 23, a fourth side wall 24 and a bottom plate BS. The second to fourth side walls 22 to 24 and bottom plate BS are substantially the same as those of the case 20 of the previous example embodiment shown in FIG. 2. Thus, any repetitive explanation will be omitted. The first side wall 21 includes a recessed portion 25 set inward from first side wall 21. The first side wall 21 contacts a surface of a printed circuit board 114, and the recessed portion 25 is spaced apart from the surface of the printed circuit board 114 to form a space between the printed circuit board 114 and the first side wall 21.

The first lead frame 52 includes a first electrode portion 51a, a first connecting portion 51b, a first buffering portion 51c and a first mounted portion 51d. The first electrode portion 51a is disposed inside of the case 20, and the first connecting portion 51b, the first buffering portion 51c and the first mounted portion 51d are disposed outside of the case 20. The first connecting portion 51b extends from the first electrode portion 51a, and passes through the case 20 so that part of the first connecting portion 51b, the first buffering portion 51c and the first mounted portion 51d may be disposed outside of the case 20.

The first electrode portion 51a is disposed on a bottom plate BS of the case 20. The first electrode portion 51a may be disposed on a plane substantially perpendicular to a surface of printed circuit board 114. The first electrode portion 51a may extend from the bottom plate BS to an opening portion OP along an inner surface of the third side wall 23.

The first connecting portion 51b extends from the first electrode portion 51a, and passes through the case 20 from the inside of the case 20 so that the first connecting portion 51b is disposed partially inside and partially outside of the case 20. For example, the first connecting portion 51b may extend from an end portion of the first electrode portion 51a, along the inner surface of third side wall 23, through an opening in the third side wall 23. The first connecting portion 51b may have a lower surface contacting the surface of the printed circuit board 114.

The first buffering portion 51c is connected to an end of the first connecting portion 51b. The first mounted portion 51d is connected to an opposite end of the first connecting portion 51b. The first buffering portion 51c is bent generally in a "U" shape as shown (although it can take on any nonlinear shape), extending generally outward from side wall 23 generally parallel to the surface of printed circuit board 114. As mentioned above, the first buffering portion 51c may have a bent shape different from the first connecting portion 51b and the first mounted portion 51d, so as to absorb and buffer impact applied between the first connecting portion 51b and the first mounted portion 51d. For example, the first buffering portion 51c may generally have a ∩-shape, a ˆ-shape and so on, which are protruded in the +X axis direction. In the present example embodiment, though the first buffering portion 51c having the ∩-shape is illustrated, the first buffering portion 51c may have any other shape, such as that resembling a sine wave having a plurality of convex and concave patterns or a spring-like shape.

Hereinafter, the first mounted portion 51d may be explained with reference to a second mounted portion 53d of the second lead frame 54. The first mounted portion 51d is connected to the first buffering portion 51c, and extends parallel to the third side wall 23 as well as downward (toward printed circuit board 114) and inward toward first side wall 21. The lower portion of second mounted portion 53d extends generally parallel to, and is connected to, the surface of printed circuit board 114. That is, the first mounted portion 51d is mounted on the printed circuit board 114 so that the case 20 may be fixed on the printed circuit board 114. The first mounted portion 51d is disposed in the space defined by the recessed portion 25 of the first side wall 21 and the surface of the printed circuit board 114.

The second lead frame 54 is substantially the same as the first lead frame 52, except that the second lead frame 54 is disposed in an area adjacent to the fourth side wall 24. Thus, any repetitive explanation will be omitted. The area adjacent/proximate to the fourth side wall 24 may be defined as any area near the fourth side wall 24.

According to the present example embodiment, the movement of the light emitting module 112d due to external forces may be reduced by the first buffering portions 51c. As the first mounted portion 51d has a rather thin vertical portion (the part extending upward from printed circuit board 114), its compliance also contributes to buffering of external forces, further reducing external forces.

Figure 9:
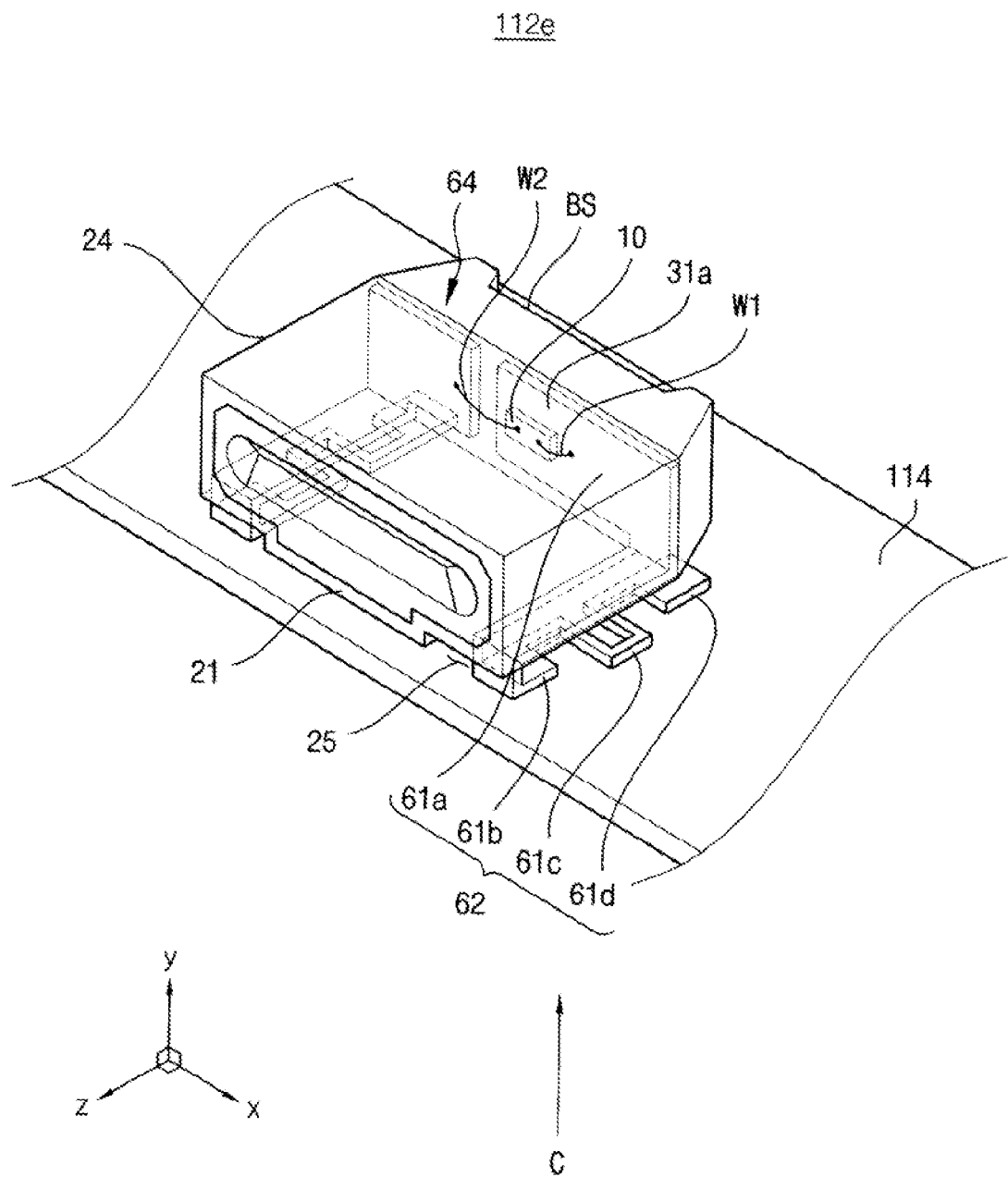
FIG. 9 is a projected perspective view illustrating a light emitting module according to still another example embodiment of the present invention.
Figure 10:
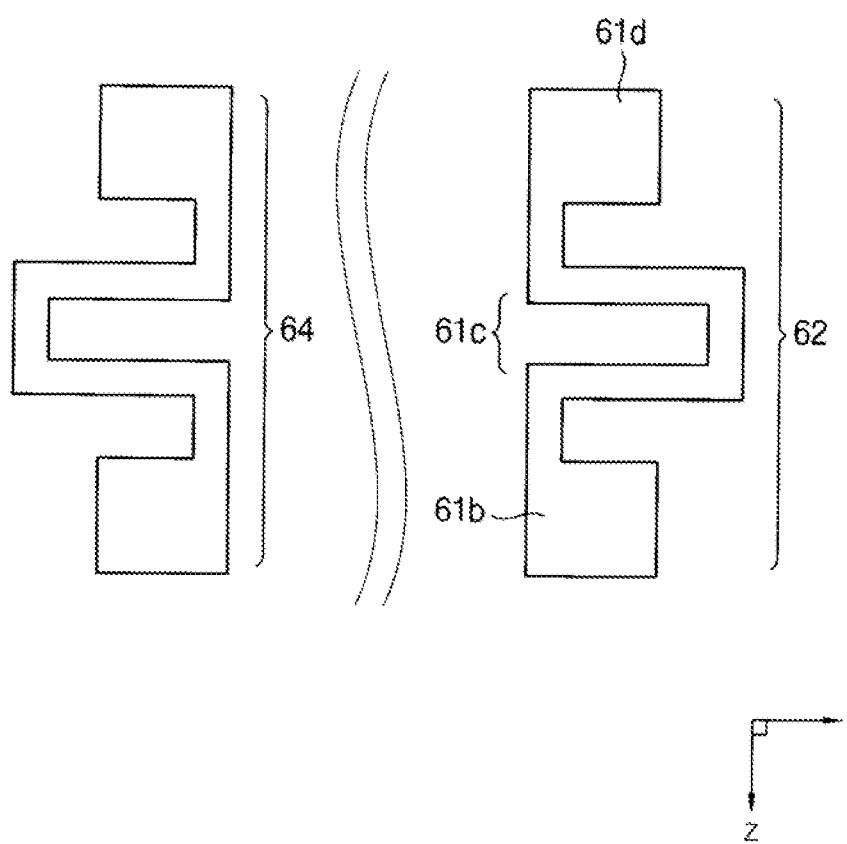
FIG. 10 is a plan view illustrating a lead frame of FIG. 9 viewed in a direction C.

FIG. 9 is a projected perspective view illustrating a light emitting module according to still another example embodiment of the present invention. FIG. 10 is a plan view illustrating a lead frame of FIG. 9 viewed in a direction C.

A display apparatus according to the present example embodiment is substantially the same as the display apparatus according to the embodiment of FIG. 1, except for its light emitting module. The light emitting module according to the present example embodiment is substantially the same as the light emitting module shown in FIG. 8, except for a structure of its lead frame. Thus, any repetitive explanation will be omitted.

Referring to FIGS. 9 and 10, the light emitting module 112e according to the present example embodiment includes a light emitting chip 10, a case 20, and first and second lead frames 62 and 64. The light emitting chip 10 is electrically connected to the first lead frame 62 through a first wire W1, and electrically connected to the second lead frame 64 through a second wire W2.

The case 20 of the present example embodiment is substantially the same as the case 20 of FIG. 8. The light emitting chip 10 is disposed on a bottom plate BS of the case 20, and emits light in a first direction (+Z axis direction) from the bottom plate BS toward an opening portion OP.

The first lead frame 62 includes a first electrode portion 61a, a first connecting portion 61b, a first buffering portion 61c and a first mounted portion 61d. The first electrode portion 61a is disposed inside of the case 20, and the first connecting portion 61b, the first buffering portion 61c and the first mounted portion 61d are disposed outside of the case 20. The first connecting portion 61b extends from the first electrode portion 61a, and passes through the case 20 so that part of the first connecting portion 61b, as well as the entire first buffering portion 61c and first mounted portion 61d, may be disposed outside of the case 20.

The first electrode portion 61a is disposed on a bottom plate BS of the case 20. The first electrode portion 61a may have a portion that is disposed on a plane substantially perpendicular to a surface of a printed circuit board 114. Other parts of the first electrode portion 61a may extend from the bottom plate BS to an opening portion OP along an inner surface of a first side wall 21 of the case 20.

The first connecting portion 61b is extended from the first electrode portion 61a, and passes through the case 20 from the inside of the case 20 so that the first connecting portion 61b is disposed outside of the case 20. For example, the first connecting portion 61b may extend from an end portion of the first electrode portion 61a through the first side wall 21. The first connecting portion 61b may have a portion generally coplanar with the surface of the printed circuit board 114.

The first buffering portion 61c is connected to the first connecting portion 61b and disposed adjacent to the first connecting portion 61b in a direction (−Z axis direction) opposite to a first direction. The first mounted portion 61d is disposed adjacent to the first buffering portion 61c in the direction (−Z axis direction) opposite to the first direction. The first buffering portion 61c extends from the first electrode portion 61a in a third direction substantially perpendicular to the first direction, so as to be connected to the first mounted portion 61d. In this case, the first buffering portion 61c is bent into a generally rectangular shape that extends along the surface of printed circuit board 114 in the +X direction, as shown. As mentioned above, the first buffering portion 61c may have a bent shape different from the first connecting portion 61b and the first mounted portion 61d, so as to absorb and buffer impact applied between the first connecting portion 61b and the first mounted portion 61d. The first buffering portion 61c is shown as having a generally rectangular shape, but any other shape is contemplated. For example, the first buffering portion 61c may have a ∩-shape, a ˆ-shape and so on, which can extend in the +X axis direction or any other suitable direction. In the present example embodiment, the first buffering portion 61c may alternatively have the shape of a sine wave form having a plurality of convex and concave patterns, or the shape of a spring.

The first mounted portion 61d is connected to the first buffering portion 61c, and faces the first side wall 21. The first mounted portion 61d is disposed adjacent to the first buffering portion 61c in a direction (−Z axis direction) opposite to the first direction. The first mounted portion 61d is mounted on the printed circuit board 114 so that the case 20 may be fixed on the printed circuit board 114.

The first connecting portion 61b, the first buffering portion 61c and the first mounted portion 61d are disposed in a space defined by the recessed portion 25 and the surface of the printed circuit board 114.

The second lead frame 64 is disposed opposite to the first side wall 21 at which the first lead frame 62 is disposed. The second lead frame 64 is substantially the same as the first lead frame 62. Thus, any repetitive explanation will be omitted. The first and second lead frames 62 and 64 may be substantially symmetrically disposed with respect to the case 20, as shown. Accordingly, though an external force is applied to the first light emitting module 102e in the direction (−Z axis direction) opposite to the first direction, the external force applied to the both sides of the case 20 may be buffered in balance.

According to the present example embodiment, the movement of the light emitting module 112e is reduced by the first buffering portions 61c. For example, in the light emitting module 112e, the first mounted portion 61d faces the first side wall 21, and is connected to the printed circuit board 114 so that external forces applied in the −Z axis direction may be more effectively absorbed as compared to a light emitting module in which first mounted portion 61d faces the third side wall 23. That is, the portions 61b, c, d are arranged generally in the Z-direction, so that they buffer Z-direction forces better than if the portions 61b, c, d were arranged facing the third side wall or in the X-direction.

According to the present invention as explained above, a lead frame of a light emitting module includes a buffering portion having increased elasticity, so that movement of the light emitting module due to externally applied forces is reduced. Accordingly, the light emitting module is more effectively kept from being separated from the printed circuit board.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A light emitting module comprising:
a light emitting chip for generating light;
a case comprising a bottom plate and a plurality of side walls connected to the bottom plate, the bottom plate and the side walls defining a receiving space in which the light emitting chip is received, the generated light being emitted in a first direction through an opening portion opposite to the bottom plate; and
a lead frame comprising:
an electrode portion disposed in the case, and electrically connected to the light emitting chip,
a connecting portion extending from the electrode portion and disposed at least partially outside of the case,
a mounted portion disposed proximate to the connecting portion and affixed to a surface of a printed circuit board, and
a buffering portion disposed between the connecting portion and the mounted portion, the buffering portion extending from the mounted portion toward the light guide plate and including a bent portion having a generally nonlinear shape protruding in a direction substantially perpendicular to the first direction to be configured for receiving pressure from the light guide plate.

2. The light emitting module of claim 1, wherein the bent portion generally has a ∩-shape or a ˆ-shape protruding from both the connecting portion and the mounted portion in the direction substantially perpendicular to the first direction.

3. The light emitting module of claim 1, wherein the connecting portion and the mounted portion are disposed at least partially parallel to a first side wall of the side walls, and
the buffering portion extends toward a second side wall that is opposite the first side wall.

4. The light emitting module of claim 3, wherein the connecting portion, the buffering portion and the mounted portion are disposed adjacent to a third side wall positioned between the first side wall and the second side wall.

5. The light emitting module of claim 4, wherein the mounted portion comprises an extended portion extending from an area proximate to the third side wall to an area proximate to the bottom plate, and positioned substantially parallel to the first side wall.

6. The light emitting module of claim 3, wherein the connecting portion extends through the bottom plate, and
the buffering portion and the mounted portion are disposed proximate to the bottom plate.

7. The light emitting module of claim 1, wherein the buffering portion extends generally away from a third side wall that connects a first side wall with a second side wall that is opposite to the first side wall and that is substantially perpendicular to the bottom plate.

8. The light emitting module of claim 7, wherein the connecting portion and the buffering portion are disposed proximate to the third side wall, and
an end portion of the buffering portion is bent toward the first side wall so that the mounted portion faces the first side wall.

9. The light emitting module of claim 7, wherein the buffering portion and the mounted portion generally face the first side wall.

10. A light providing assembly comprising:
a light guide plate comprising a light incident surface and a light exiting surface;
a light emitting module comprising:

a light emitting chip facing the incident surface and configured to provide light to the light incident surface of the light guide plate;

a case comprising a bottom plate and a plurality of side walls connected to the bottom plate, the bottom plate and the side walls defining a receiving space in which the light emitting chip is received, the provided light being emitted in a first direction through an opening portion opposite to the bottom plate; and a lead frame comprising:

an electrode portion disposed in the case, and electrically connected to the light emitting chip, a connecting portion extending from the electrode portion and disposed at least partially outside of the case, a mounted portion disposed proximate to the connecting portion, and a buffering portion disposed between the connecting portion and the mounted portion, the buffering portion extending from the mounted portion toward the light guide plate and including a bent portion having a generally nonlinear shape protruding in a direction substantially perpendicular to the first direction to be configured for receiving pressure from the light guide plate; and a printed circuit board having a surface facing at least one of the bottom plate and any one of the side walls, electrically connected to the mounted portion so as to affix the light emitting module to the surface, and configured to transmit a light source signal to the light emitting module.

11. The light providing assembly of claim 10, wherein the connecting portion and the mounted portion are disposed at least partially parallel to a first side wall of the side walls, and the buffering portion extends toward a second side wall that is opposite the first side wall.

12. The light providing assembly of claim 1, wherein the connecting portion, the buffering portion and the mounted portion are disposed adjacent to a third side wall positioned between the first side wall and the second side wall.

13. The light providing assembly of claim 12, wherein the mounted portion comprises an extended portion extending from an area proximate to the third side wall to an area proximate to the bottom plate, so as to face the bottom plate.

14. The light providing assembly of claim 11, wherein the connecting portion extends through the bottom plate, the buffering portion and the mounted portion are disposed proximate to the bottom plate, and the connecting portion, the buffering portion and the mounted portion are disposed on the surface of the printed circuit board.

15. The light providing assembly of claim 10, wherein the buffering portion extends generally away from a third side wall that connects a first side wall with a second side wall that is opposite to the first side wall and that is substantially perpendicular to the bottom plate, wherein the first side wall is substantially parallel to the printed circuit board.

16. The light providing assembly of claim 15, wherein the connecting portion and the buffering portion are disposed proximate to the third side wall, and an end portion of the buffering portion is bent toward the first side wall so that the mounted portion is disposed between the first side wall and the surface of the printed circuit board.

17. The light providing assembly of claim 15, wherein the buffering portion and the mounted portion are disposed between the first side wall and the printed circuit board.

18. The light providing assembly of claim 17, wherein a portion of the first side wall is recessed from the surface of the printed circuit board so as to form a space between the printed circuit board and the case, and the buffering portion and the mounted portion are disposed in the space.

\* \* \* \* \*